United States Patent
Hong

(10) Patent No.: US 11,170,385 B2
(45) Date of Patent: Nov. 9, 2021

(54) RFID-BASED GENUINE PRODUCT CERTIFICATION SERVICE SYSTEM AND METHOD EMPLOYING CODE UPDATE ALGORITHM FOR FORGERY PREVENTION

(71) Applicant: VISUALNET INC., Gyeonggi-do (KR)

(72) Inventor: Jong Hyuck Hong, Gyeonggi-do (KR)

(73) Assignee: VISUALNET INC., Gyeonggi-Do (KR)

( * ) Notice: Subject to any disclaimer, the term of this patent is extended or adjusted under 35 U.S.C. 154(b) by 173 days.

(21) Appl. No.: 16/542,239

(22) Filed: Aug. 15, 2019

(65) Prior Publication Data
US 2019/0370823 A1  Dec. 5, 2019

Related U.S. Application Data

(63) Continuation of application No. PCT/KR2018/002060, filed on Feb. 20, 2018.

(30) Foreign Application Priority Data

Jan. 30, 2018 (KR) ......................... 10-2018-0011686

(51) Int. Cl.
*G06Q 99/00* (2006.01)
*G06Q 30/00* (2012.01)
(Continued)

(52) U.S. Cl.
CPC ..... *G06Q 30/0185* (2013.01); *G06K 7/10366* (2013.01); *G06K 19/0723* (2013.01)

(58) Field of Classification Search
CPC ........... G06Q 30/0185; G06K 7/10366; G06K 19/0723
(Continued)

(56) References Cited

U.S. PATENT DOCUMENTS 7,450,010 B1 *  11/2008  Gravelle ............... G06F 21/606
                                                        340/572.1
2015/0022314 A1 *  1/2015  Povolny .................. G06F 21/44
                                                        340/5.8
(Continued)

FOREIGN PATENT DOCUMENTS

KR    10-2007-0052092 A    6/2007
KR         10-0851585 B1    8/2008
(Continued)

OTHER PUBLICATIONS

International Search Report in PCT/KR2018/002060, dated Oct. 24, 2018 (2 pages).

*Primary Examiner* — Ahshik Kim
(74) *Attorney, Agent, or Firm* — Sheppard Mullin Richter & Hampton LLP

(57) ABSTRACT

The inventive concept relates to a radio frequency identification (RFID)-based genuine product certification service system and method employing a code update algorithm for forgery prevention in which a genuine product certification processing server stores an RFID tag access code and a variable genuine product certification code in an RFID tag through a wired or wireless terminal including an RFID writer and reader and a database thereof for genuine product certification to determine whether a product or document is genuine using the tag information stored in the RFID tag and the genuine product certification code when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt or at regular intervals to prevent a genuine product certification attempt with a (Continued)

RFID SYSTEM CONFIGURATION – PASSIVE TAG duplicate using the periodically updated variable genuine product certification code even when a person copies the RFID tag for the purpose of forgery.

12 Claims, 5 Drawing Sheets

(51) Int. Cl.
*G06K 7/10* (2006.01)
*G06K 19/07* (2006.01)

(58) Field of Classification Search
USPC .......................................................... 705/318
See application file for complete search history.

(56) References Cited

U.S. PATENT DOCUMENTS

| 2015/0134552 | A1* | 5/2015 | Engels | .................. | H04L 9/3297 |
| | | | | | 705/318 |
| 2018/0034631 | A1* | 2/2018 | Ries | .................. | G06Q 30/0185 |
| 2018/0047032 | A1* | 2/2018 | Wu | .................... | G06Q 30/0185 |
| 2019/0188731 | A1* | 6/2019 | Roberts | ................ | B42D 25/305 |

FOREIGN PATENT DOCUMENTS

| KR | 10-2009-0041473 A | 4/2009 |
| KR | 10-2011-0111661 A | 10/2011 |
| KR | 10-1285972 B1 | 7/2013 |

\* cited by examiner

RFID-BASED GENUINE PRODUCT CERTIFICATION SERVICE SYSTEM AND METHOD EMPLOYING CODE UPDATE ALGORITHM FOR FORGERY PREVENTION

CROSS-REFERENCE TO RELATED APPLICATIONS

The present application is a continuation of International Application No. PCT/KR2018/002060, filed Feb. 20, 2018, which claims priority to Korean Patent Application No. 10-2018-0011686, filed Jan. 39, 2018, the entire contents of which are incorporated herewith in their entirety.

BACKGROUND

Technical Field

The inventive concept relates to a radio frequency identification (RFID)-based genuine product certification service system and method and more particularly, to an RFID-based genuine product certification service system and method employing a code update algorithm for forgery prevention in which a genuine product certification processing server stores an RFID tag access code and a variable genuine product certification code in an RFID tag through a wired or wireless terminal including an RFID writer and reader and a database thereof for genuine product certification to determine whether a product or document is genuine using the tag information stored in the RFID tag and the genuine product certification code when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt or at regular intervals to prevent a genuine product certification attempt with a duplicate using the periodically updated variable genuine product certification code even when a person copies the RFID tag for the purpose of forgery.

Description of the Related Art

FIG. 1 is a diagram showing a configuration of a conventional 13.56 MHz radio frequency identification (RFID) tag, RFID reader, and system.

RFID is a system including an RFID tag 10 which includes unique information attached to a product, an RFID reader 20 which reads the tag information attached to a product using a wireless communication technology in the 13.56 MHz or 900 MHz RFID frequency band, and a host computer 30 having an application to which the information recognized by the RFID reader 20 is transmitted through RFID middleware.

RFID technology for product management is standardized by sub-committee 31 (SC31) of the joint technical committee 1 (JTC1) of the International Organization for Standardization (ISO) and the International Electrotechnical Commission (IEC), and an air interface protocol is defined in ISO/IEC 18000 series according to each frequency between an RFID reader and tag.

RFID frequencies use 135 kHz, 13.56 MHz, 433 MHz, 860 to 960 MHz, and 2.45 GHz bands. Low-frequency 13.56 MHz RFID systems are used for recognizing tags attached to products and may have a recognition distance of a few several centimeters. A high-frequency 900 MHz ultra-high frequency (UHF) RFID system, which was proposed by EPC Global and is being used, can recognize an RFID tag from a distance of up to 100 m and is used for distribution logistics, port containers, and the like.

Mobile RFID convergence of near field communication (NFC) forum provides a mobile RFID information service employing a cellular phone in the 13.56 MHz RFID frequency band and associates the UHF band of EPC Global, which is the 900 MHz RFID frequency band, with the distribution logistics field (business to business (B2B) and business to customer (B2C)), thereby proposing mobile RFID convergence in B2B2C form.

FIG. 2 is a diagram showing RFID frequency standards of major countries in the UHF 900 MHz band. Major countries use 902 MHz to 928 MHz industrial, scientific, and medical (ISM) bands as RFID frequency bands in the UHF band and use 50 or more channels each having an occupied bandwidth of 500 kHz. Europe uses 865 MHz to 868 MHz as RFID frequency bands and may use about 15 channels, each having a limited occupied bandwidth of 200 kHz. Australia uses 918 MHz to 926 MHz, Korea uses 910 to 914 MHz, which is a occupied bandwidth of 200 kHz similar to that of Europe, and Japan uses 950 MHz to 956 MHz.

In Table 1, functions are compared between RFID tags and readers employing 13.56 MHz and 900 MHz.

TABLE 1

| RFID | 13.56 MHz | 900 MHz |
|---|---|---|
| Reader | A short range of 10 cm or less | Long range recognition (up to 1 m) |
| Tag | Inventory management, parking management, library book management A transportation card, a financial transaction card, a smart card, and an ID card A mobile RFID information service employing a smart phone | Attach RFID tags to products of B2C distribution logistics and B2B companies |

An RFID reader and an RFID tag are configured as a forward link and a reverse link according to the transmission direction of information. In the forward link, a command signal and a continuous wave (CW) signal for supplying power to the tag are transmitted from the RFID reader to the tag in order to obtain unique information of the tag. The reverse link is a process in which the tag transmits a tag signal to the RFID reader through a backscattering process on the basis of the CW signal received from the RFID reader.

RFID tags are composed of a tag chip including unique product information and an antenna and classified as an active tag and a passive tag.

The active tag employs battery power therein and can collect information independently of RFID readers. Since a battery is installed in the active tag, the price rises and the size and weight are increased. Also, when the life of the battery ends, the period of use ends, and functionality is lost as an RFID tag.

The passive tag operates the tag chip by generating direct current (DC) power from an RF signal received from an RFID reader. Communication between the passive tag and the RFID reader is performed in an asynchronous manner. When there is a response request of the RFID reader, the passive tag transmits data through back scattering modulation. The passive tag does not have a power source and is supplied with driving power therefor from electric power received from the RFID reader. A distance, at which the passive tag can be supplied with power from the RFID reader, is limited, and thus the passive tag has a short recognition distance and is operated with low electric power.

Systems including RFID tags and a reader are applied to many fields, such as inventory management, distribution, logistics, the port industry, the pharmaceutical industry, the medical industry, and ammunition management of the Defense Ministry.

As Prior Art 1 related to an RFID system, Korean Patent No. 10-08172220000 discloses "Method for Encrypting/Decrypting Electronic Product Code and RFID System Using the Same," which improves the safety of an electronic product code (EPC) in an RFID authentication process by encrypting and decrypting the EPC on the basis of an advanced encryption standard (AES) encryption/decryption algorithm.

An RFID system for encrypting an EPC includes an RFID tag which stores an EPC, transmits the stored EPC to an RFID reader, and receives an encrypted RFID code from the RFID reader to store the encrypted EPC, the RFID reader which reads and transfers the EPC stored in the RFID tag to middleware and transmits the encrypted EPC received from the middleware to the RFID tag, the middleware including an encryption module which pads a random number to the EPC received from the RFID reader, encrypts the EPC with the random number on the basis of an encryption algorithm, divides the encrypted EPC into a forefront code and a backend code to store the forefront code and the backend code in a database, and transmits the encrypted EPC to the RFID tag via the RFID reader, and the database which has an index area and an information area in which the forefront code and the backend code of the EPC encrypted by the encryption module of the middleware are stored, respectively.

Although a tag value and a code stored in a wireless electronic tag (an RFID tag) can be read by a wired or wireless terminal equipped with an RFID reader, it is not possible to solve the problem of RFID tag forgery. Also, the prior art does not provide a function of preventing imitations (fakes) of medicine, food and beverages, luxury goods, alcohol, products, etc. to which a wireless electronic tag (an RFID tag) is attached and a function of preventing forgery of important documents, such as an ID card, a contract, and a notarized document, to which a wireless electronic tag (an RFID tag) is attached.

SUMMARY

The inventive concept is directed to providing a radio frequency identification (RFID)-based genuine product certification service system employing a code update algorithm for forgery prevention, wherein a genuine product certification processing server stores an RFID tag access code and a variable genuine product certification code in an RFID tag through a wired or wireless terminal including an RFID writer and reader and a database thereof for genuine product certification to determine whether a product or document is genuine using the tag information stored in the RFID tag and the genuine product certification code when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt or at regular intervals to prevent a genuine product certification attempt with a duplicate using the periodically updated variable genuine product certification code even when a person copies the RFID tag for the purpose of forgery.

The inventive concept is also directed to providing an RFID-based genuine product certification service method employing a code update algorithm for forgery prevention.

For achieving the object of the inventive concept, a radio frequency identification (RFID)-based genuine product certification service system employing a code update algorithm for forgery prevention, the system comprises an RFID tag configured to be attached to a product or document; a wired or wireless terminal including an RFID writer and reader configured to receive a new genuine product certification code updated at regular intervals or every time genuine product certification is attempted from a genuine product certification processing server, write the received new genuine product certification code in the RFID tag, and read and decode an RFID tag ID number, an RFID tag access code, and a genuine product certification code from the RFID tag at a recognition distance; a genuine product certification processing server configured to receive, when the RFID tag receives an RFID tag access code from the wired or wireless terminal and an access right is confirmed, an RFID tag ID number and a genuine product certification code through the wired or wireless terminal including an RFID writer and reader, compare the received genuine product certification code with a genuine product certification code previously stored in a storage device, provide a genuine product certificate and detailed product information to the wired or wireless terminal, and store a receiving time and log information; and a genuine product certification information storage device configured to be connected to the genuine product certification processing server and store an RFID tag ID number, an RFID tag access code, a genuine product certification code, and detailed product information of each RFID tag.

For achieving the another object of the inventive concept, a radio frequency identification (RFID)-based genuine product certification service method employing a code update algorithm for forgery prevention, the method comprises an (a) step in which an RFID tag ID number, an RFID tag access code, and a genuine product certification code are stored in an RFID tag, and a wired or wireless terminal including an RFID writer and reader recognizes an RFID tag attached to a product or document at a recognition distance; a (b) step in which the wired or wireless terminal requests the recognized RFID tag and the RFID tag access code from a genuine product certification processing server, and the genuine product certification processing server checks an access right to the RFID tag by inquiring of a genuine product certification information storage device and transmits an RFID tag access code for the RFID tag to the wired or wireless terminal; a (c) step in which the wired or wireless terminal transmits the RFID tag access code to the RFID tag, the RFID tag compares the received RFID tag access code with the RFID tag access code stored in a memory thereof, and when the RFID tag access codes coincide with each other, the wired or wireless terminal recognizes the RFID tag ID number and the genuine product certification code of the RFID code and requests genuine product certification by transmitting the RFID tag ID number and the genuine product certification code to the genuine product certification processing server; a (d) step in which the genuine product certification processing server retrieves detailed product information of the RFID tag, with which genuine product certification has been requested, stored in the genuine product certification information storage device, transmits a genuine product certification success response, the detailed product information, and a new genuine product certification code to the wired or wireless terminal when the genuine product certification code coincides with the genuine product certification code stored in the genuine product certification information storage device, and stores the new genuine product certification code in the genuine product certification information storage device; and an (e) step in which the wired or wireless terminal outputs a success of genuine product certification and the detailed product information on a display window thereof and transmits the new genuine product certification code to the RFID tag, and the RFID tag stores the new genuine product certification code.

In a radio frequency identification (RFID)-based genuine product certification service system and method employing a code update algorithm for forgery prevention according to the inventive concept, a genuine product certification processing server stores an RFID tag access code and a variable genuine product certification code in an RFID tag through a wired or wireless terminal including an RFID writer and reader and a database thereof for genuine product certification to determine whether a product or document is genuine using the tag information stored in the RFID tag and the genuine product certification code when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt or at regular intervals. Accordingly, it is possible to prevent a genuine product certification attempt with a duplicate using the periodically updated variable genuine product certification code even when a person copies the RFID tag for the purpose of forgery.

As such, it is possible to prevent imitations (fakes) of medicine, food and beverages, luxury goods, alcohol, products, etc. to which RFID tags are attached and forgery of important documents, such as an ID card, a contract, and a notarized document to which RFID tags are attached. The genuine product certification processing server can prevent forgery of RFID tags attached to products and documents by updating the RFID tags with new genuine product certification codes through the wired or wireless terminal including an RFID writer and reader at regular intervals or every time genuine product certification is attempted.

DETAILED DESCRIPTION OF THE EMBODIMENTS

Hereinafter, configurations and operations according to exemplary embodiments of the inventive concept will be described in detail with reference to the accompanying drawings.

Figure 1:
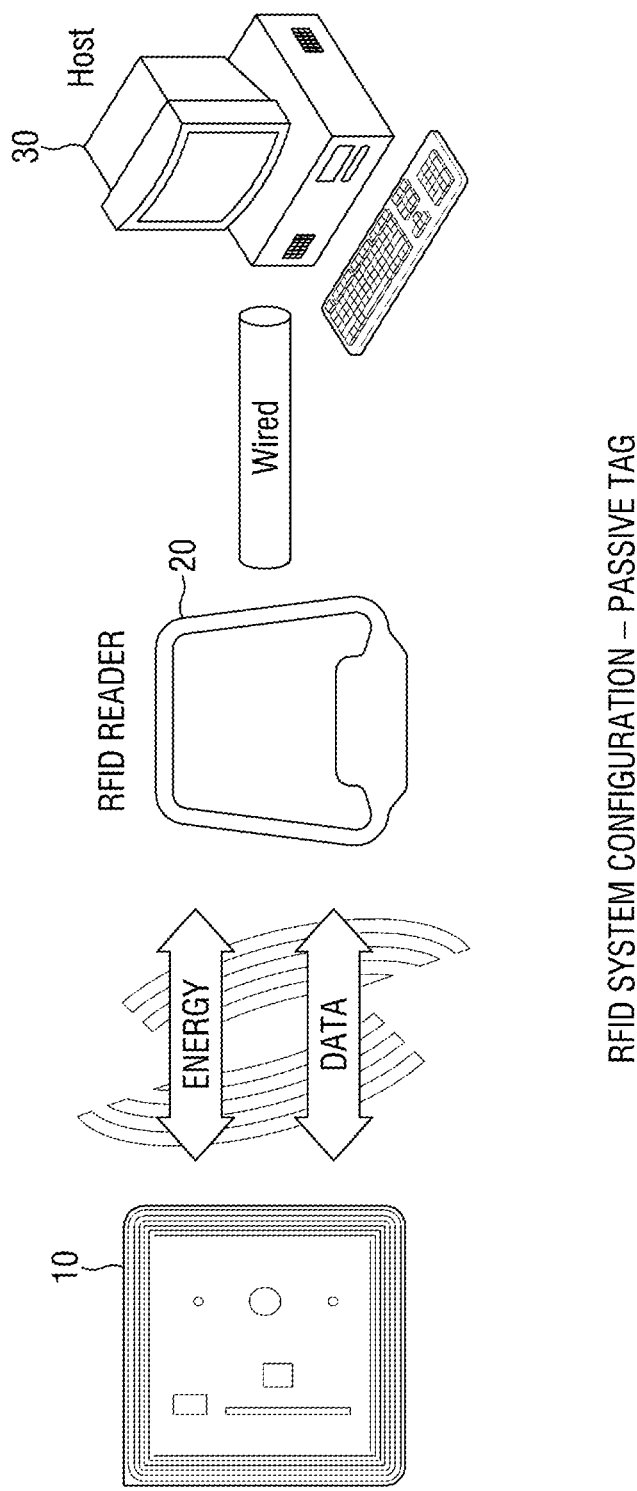
FIG. 1 is a diagram showing a configuration of a conventional 13.56 MHz radio frequency identification (RFID) tag, RFID reader, and system.
Figure 2:
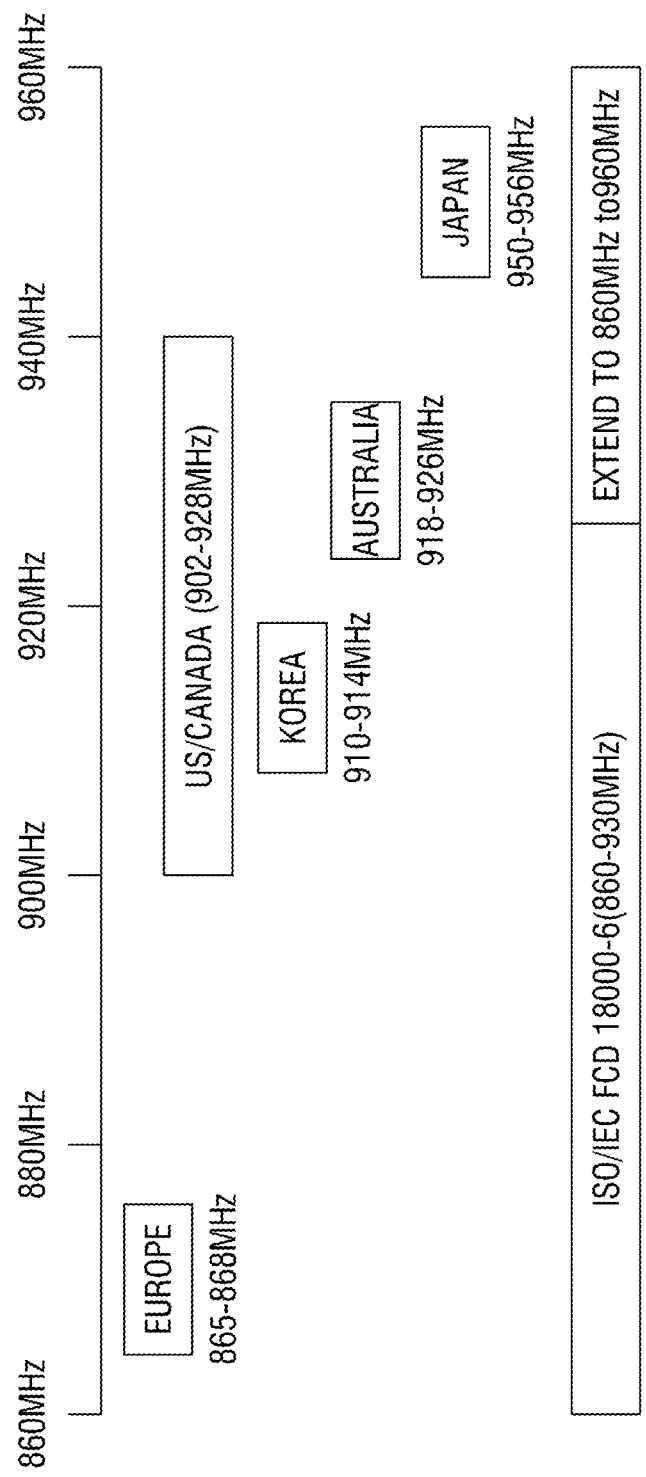
FIG. 2 is a diagram showing RFID frequency standards of major countries in the ultra-high frequency (UHF) 900 MHz band.
Figure 3:
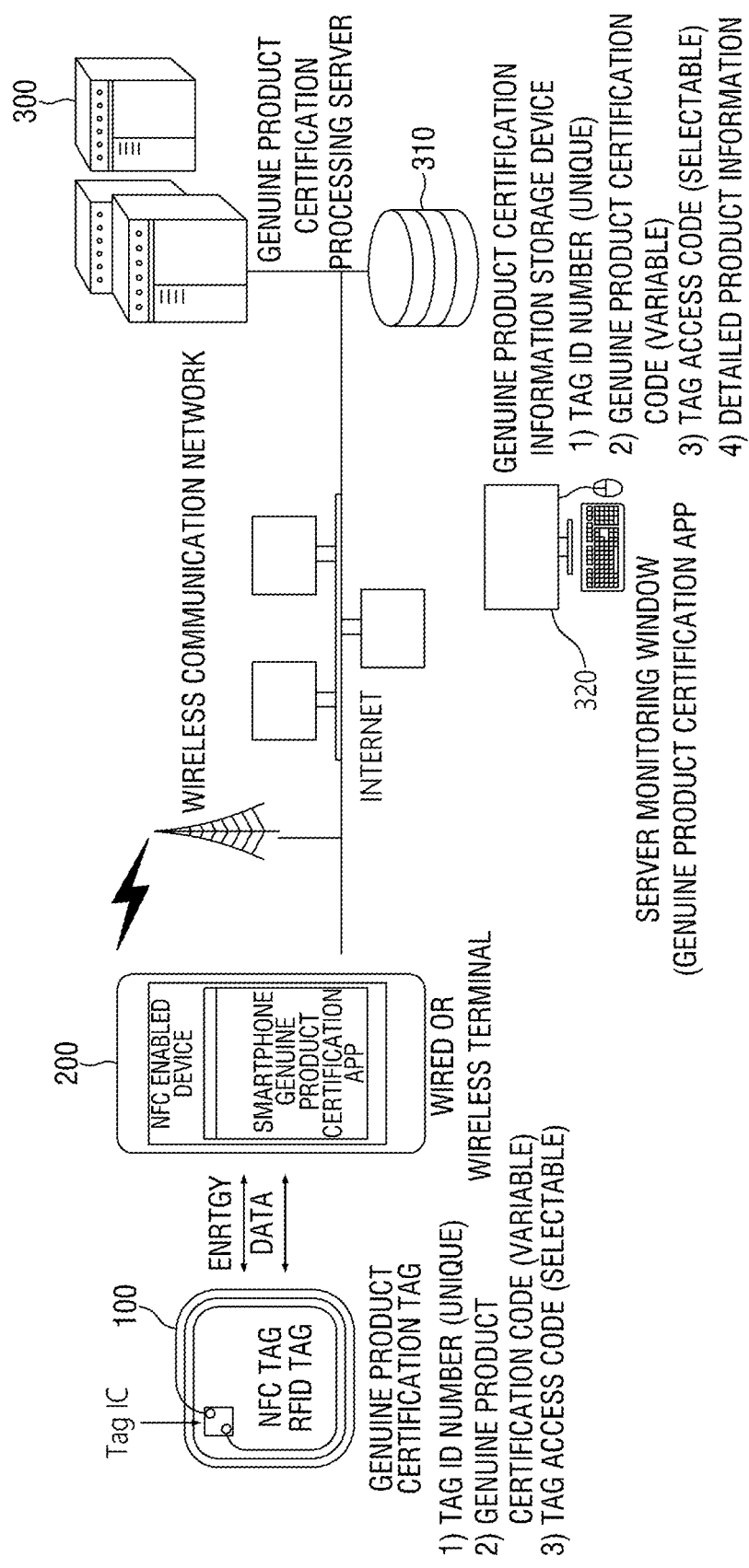
FIG. 3 is a diagram showing a configuration of an RFID-based genuine product certification service system employing a code update algorithm for forgery prevention according to the inventive concept.

FIG. 3 is a diagram showing a configuration of a radio frequency identification (RFID)-based genuine product certification service system employing a code update algorithm for forgery prevention according to the inventive concept.

In an RFID-based genuine product certification service system and method employing a code update algorithm for forgery prevention according to the inventive concept, a genuine product certification processing server stores a variable genuine product certification code in an RFID tag through a wired or wireless terminal including an RFID writer and reader and a database thereof for genuine product certification to use an RFID tag ID number stored in the RFID tag and a genuine product certification code for determining whether a product or document is genuine when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt with a genuine product certification code or at regular intervals to prevent a genuine product certification attempt with a duplicate using the periodically updated variable genuine product certification code even when a person copies the RFID tag for the purpose of forgery.

The RFID-based genuine product certification service system employing a code update algorithm for forgery prevention includes an RFID tag 100 which stores an RFID tag ID number, an RFID tag access code, and a genuine product certification code and is attached to a product or document;

a wired or wireless terminal 200 which receives a new genuine product certification code updated at regular intervals or every time genuine product certification is attempted from the genuine product certification processing server 300, writes the received new genuine product certification code in the RFID tag, and includes an RFID writer and reader for reading and decoding an RFID tag ID number, an RFID tag access code, and a genuine product certification code from the RFID tag at a recognition distance; and a genuine product certification processing server 300 which receives, when the RFID tag 100 receives an RFID tag access code from the wired or wireless terminal 200 and an access right is confirmed, an RFID tag ID number and a genuine product certification code through the wired or wireless terminal including an RFID writer and reader, compares the received genuine product certification code with a genuine product certification code previously stored in a storage device, provides a genuine product certificate and detailed product information to the wired or wireless terminal 200, stores a new genuine product certification code for preventing forgery of the product or document in a genuine product certification information storage device thereof at regular intervals or every time genuine product certification is attempted, simultaneously stores the new genuine product certification code in an RFID tag attached to the product or document through the wired or wireless terminal including an RFID writer and reader, and stores a receiving time and log information; and a genuine product certification information storage device 310 which is connected to the genuine product certification processing server 300 and stores an RFID tag ID number, an RFID tag access code, a genuine product certification code, and detailed product information of each RFID tag.

The RFID tag 100 attached to the product or document includes an antenna, a tag chip, and a memory. In the RFID tag 100, a unique RFID tag ID number, an RFID tag access code, and a genuine product certification code are stored, and a new genuine product certification code, which is variably updated to prevent forgery at regular intervals or every time genuine product certification is attempted, is stored. The RFID tag is any one of 13.56 MHz, 900 MHz, and 2.4 GHz RFID tags.

The RFID tag access code and the genuine product certification code are not encrypted or decrypted.

The wired or wireless terminal 200 including an RFID writer and reader is a smart phone or a tablet personal computer (PC) which includes a Wi-Fi communication unit, a Bluetooth communication unit, or a code division multiple access (CDMA) or long term evolution (LTE) mobile communication unit so as to be connected to the genuine product certification processing server 300, and on which a genuine product certification application (app) is installed.

The wired or wireless terminal 200 including an RFID writer and reader is a smart phone or a tablet PC which includes a Wi-Fi communication unit, a Bluetooth communication unit, or a mobile communication unit supporting a CDMA or LTE protocol and a global positioning system (GPS) receiver and is connected to the RFID writer and reader and on which the genuine product certification app is installed.

The wired or wireless terminal 200 including an RFID writer and reader is a narrowband Internet of things (NB-IoT) terminal which includes a key input unit, a main control unit (MCU), a storage unit, a display unit, an NB-IoT module, and a GPS receiver and on which the RFID writer and reader are mounted and the genuine product certification app is installed, or is an IoT device which includes a key input unit, an MCU, a storage unit, a display unit, a Wi-Fi communication unit, a Bluetooth communication unit, and a GPS receiver and on which the RFID writer and reader are mounted and the genuine product certification app is installed. The wired or wireless terminal 200 further includes a GPS receiver and transmits information of the RFID tag attached to the product or document and GPS location information to the genuine product certification processing server at the location every time the wired or wireless terminal 200 recognizes the RFID tag attached to the product or document.

Figure 4:
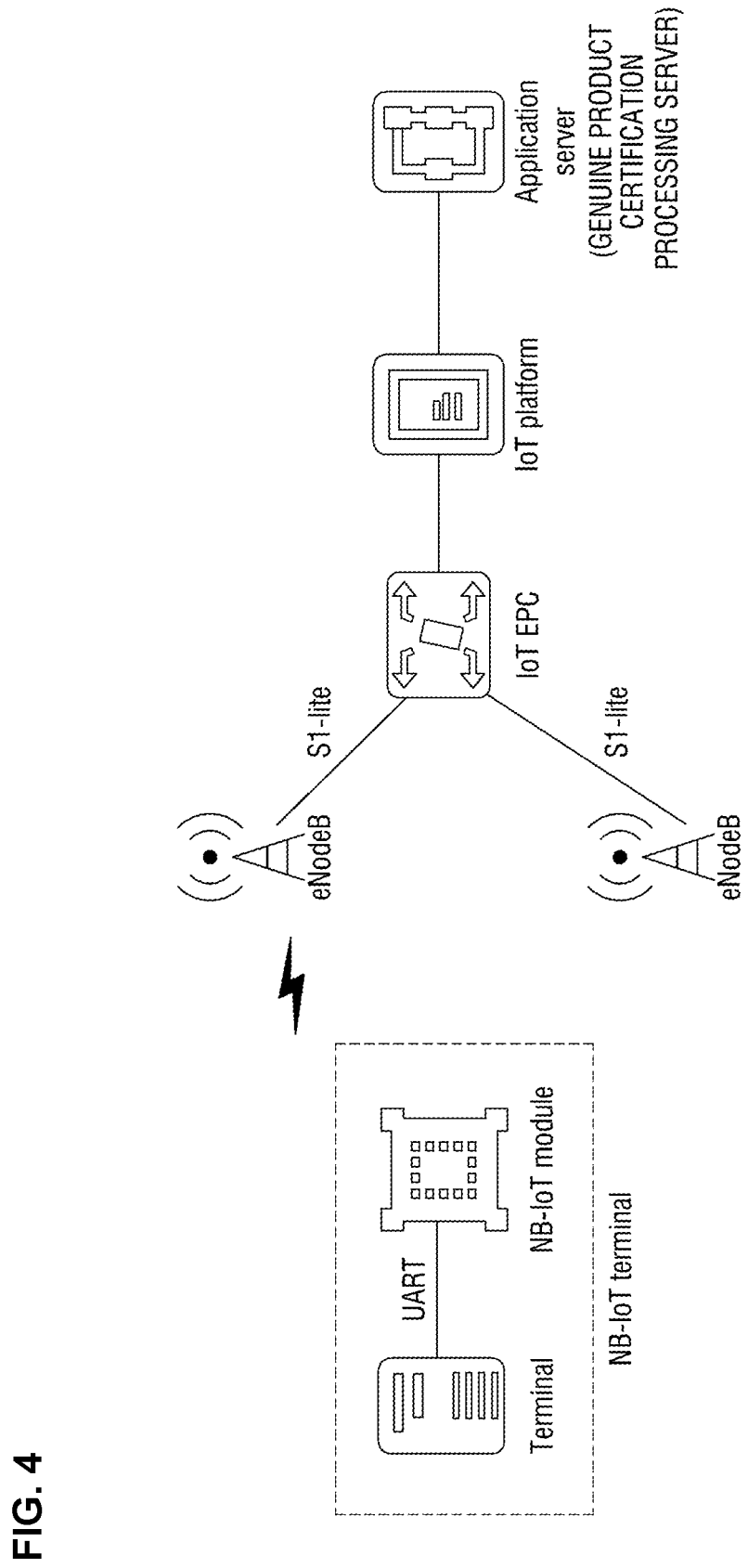
FIG. 4 is a diagram showing a network configuration of a narrowband Internet of Things (NB-IoT) terminal which can communicate with a genuine product certification processing server and includes an RFID writer and reader.

FIG. 4 is a diagram showing a network configuration of an NB-IoT terminal which can communicate with a genuine product certification processing server and includes an RFID writer and reader.

The wired or wireless terminal 200 having an RFID writer and reader is a NB-IoT terminal (an IoT device), which includes a key input unit, an MCU, a storage unit, a display unit, and an NB-IoT module, and on which the RFID writer and reader are mounted and the genuine product certification app is installed and is connected to the genuine product certification processing server via an NB-IoT network. Alternatively, the wired or wireless terminal 200 is an IoT device, which includes a key input unit, an MCU, a storage unit, a liquid crystal display (LCD) unit, a Wi-Fi and Bluetooth communication unit, and a GPS receiver, and on which the RFID writer and reader are mounted and the genuine product certification app is installed.

The NB-IoT terminal (an IoT device) is configured with an NB-IoT module (an NB-IoT communication unit) which is connected to an MCU of terminals including a key input unit, the MCU, a storage unit, an LCD unit through a universal asynchronous receiver/transmitter (UART), and the NB-IoT module is used to communicate with an evolved node base station (eNodeB) through a Uu interface.

The NB-IoT module and a control processor of the NB-IoT terminal perform UART communication with each other, and the NB-IoT module of the NB-IoT terminal communicates with the NB-IoT network according to an NB-IoT protocol.

The eNodeB processes a network access message through the Uu interface, manages cells, and forwards non-access stratum (NAS) data to a higher-layer network element (NE). The eNodeB is connected to an IoT electronic product code (EPC) through an S1-lite interface.

The IoT EPC exchanges information with the NB-IoT terminal at the NAS layer and forwards data related to an NB-IoT service to an IoT platform for processing.

The IoT platform collects IoT data (an RFID tag ID number, an RFID tag access code, and a genuine product certification code) from the NB-IoT terminal in a wireless access network and transmits the collected IoT data to a service app (an application program of a PC or the genuine product certification app).

An application server (the genuine product certification processing server) collects IoT data from the NB-IoT terminal via the NB-IoT network and performs genuine product certification processing.

Unlike this, the wired or wireless terminal 200 including an RFID writer and reader includes an RFID writer/reader. When an IoT device including a key input unit, an MCU, a storage unit, an LCD unit, a Wi-Fi or Bluetooth communication unit, and a GPS receiver is used, the wired or wireless terminal 200 is connected to the genuine product certification processing server 300 through the IoT device 4 an IoT gateway 4 and a router.

Also, every time the wired or wireless terminal 200 including an RFID writer and reader recognizes the RFID tag 100 attached to the product or document, the wired or wireless terminal 200 may transmit information of the RFID tag attached to the product or document and GPS location information to the genuine product certification processing server 300 at the location.

The RFID-based genuine product certification service system employing a code update algorithm for forgery prevention further includes a server monitoring terminal 320 on which the genuine product certification app is installed and which monitors states of the wired or wireless terminal 200 including an RFID writer and reader and the genuine product certification app installed thereon, the genuine product certification processing server 300, and the genuine product certification information storage device 310.

The server monitoring terminal 320 is connected to the genuine product certification processing server 300. A genuine product certification process is monitored on a screen of the server monitoring terminal 320, beginning with a process in which the wired or wireless terminal 200 including an RFID writer and reader recognizes the RFID tag attached to the product or document at the recognition distance. When the RFID tag 100 is recognized and the product or document is not certified as genuine, the server monitoring terminal 320 generates an alarm, checks the GPS location of the wired or wireless terminal, and monitors the RFID tag 100 attached to the product or document.

Figure 5:
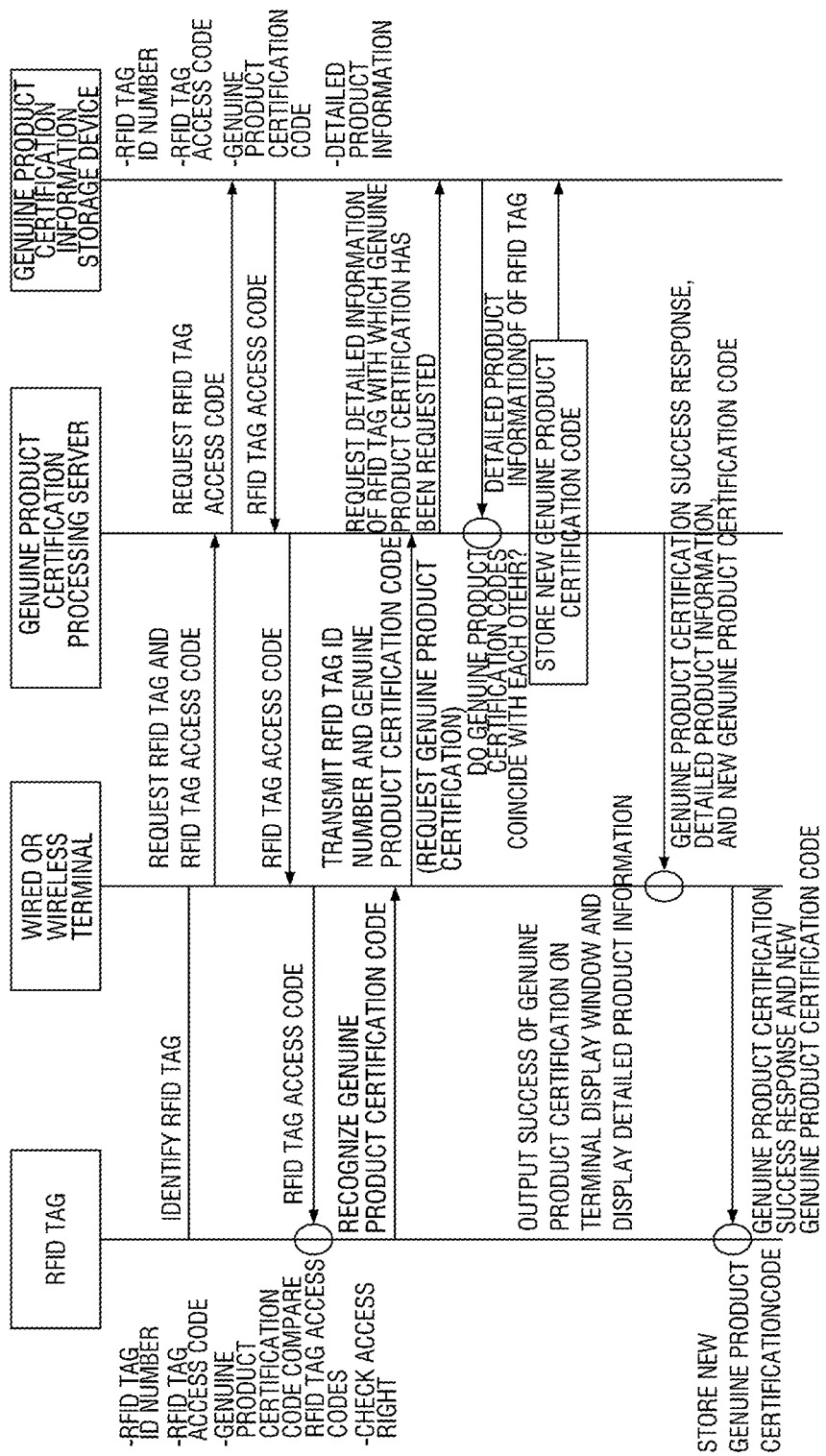
FIG. 5 is a sequence diagram of a RFID-based genuine product certification service method employing a code update algorithm for forgery prevention according to an embodiment of the inventive concept.

FIG. 5 is a sequence diagram of a RFID-based genuine product certification service method employing a code update algorithm for forgery prevention according to an embodiment of the inventive concept.

The RFID-based genuine product certification service method employing a code update algorithm for forgery prevention according to the inventive concept includes an (a) step in which an RFID tag ID number, an RFID tag access code, and a genuine product certification code are stored in an RFID tag and a wired or wireless terminal including an RFID writer and reader recognizes the RFID tag attached to a product or document at a recognition distance; a (b) step in which the wired or wireless terminal including an RFID writer and reader and including a Wi-Fi communication unit or a CDMA or LTE mobile communication unit so as to be connected to a genuine product certification processing server requests the recognized RFID tag and the RFID tag access code from the genuine product certification processing server and the genuine product certification processing server checks an access right to the RFID tag by inquiring of a genuine product certification information storage device and transmits an RFID tag access code for the RFID tag to the wired or wireless terminal; a (c) step in which the wired or wireless terminal transmits the RFID tag access code to the RFID tag, the RFID tag compares the received RFID tag access code with the RFID tag access code stored in a memory thereof, and when the RFID tag access codes coincide with each other, the wired or wireless terminal recognizes the RFID tag ID number and the genuine product certification code of the RFID code and requests genuine product certification by transmitting the RFID tag ID number and the genuine product certification code to the genuine product certification processing server; a (d) step in which the genuine product certification processing server retrieves detailed product information of the RFID tag, with which genuine product certification has been requested, stored in the genuine product certification information storage device, transmits a genuine product certification success response, the detailed product information, and a new genuine product certification code to the wired or wireless terminal when the genuine product certification code coincides with the genuine product certification code stored in the genuine product certification information storage device, and stores the new genuine product certification code in the genuine product certification information storage device; and an (e) step in which the wired or wireless terminal outputs the success of genuine product certification and the detailed product information on a display window thereof and transmits the new genuine product certification code to the RFID tag and the RFID tag stores the new genuine product certification code.

In the RFID tag, the unique RFID tag ID number, the RFID tag access code, and a genuine product certification code are stored, and a new genuine product certification code which is variably updated to prevent forgery is stored at regular intervals or every time genuine product certification is attempted.

The RFID tag is any one of 13.56 MHz, 900 MHz, and 2.4 GHz RFID tags.

In the (c) step of the method, the wired or wireless terminal transmits the RFID tag access code to the RFID tag, and the RFID tag compares the received RFID tag access code with the RFID tag access code stored in the memory thereof and cannot store a new genuine product certification code when the RFID tag access codes do not coincide with each other.

In the (d) and (e) steps of the method, at regular intervals or every time genuine product certification is attempted, the genuine product certification processing server provides a genuine product certificate and the detailed product information to the wired or wireless terminal according to the RFID tag ID number and the genuine product certification code, stores a new genuine product certification code for preventing forgery of the product or document in a genuine product certification information storage device thereof, records the time and log information, and simultaneously writes and stores the new genuine product certification code in the RFID tag attached to the product or document through the wired or wireless terminal.

The method further includes an (f) step in which a server monitoring terminal having a genuine product certification app installed thereon monitors states of the wired or wireless terminal including an RFID writer and reader and a genuine product certification app installed thereon, the genuine product certification processing server, and the genuine product certification information storage device in the RFID-based genuine product certification service system employing a code update algorithm for forgery prevention.

Every time the wired or wireless terminal 200 including a GPS receiver recognizes the RFID tag 100 attached to the product or document, the wired or wireless terminal 200 may transmit information of the RFID tag attached to the product or document and GPS location information to the genuine product certification processing server 300 at the location.

The server monitoring terminal 320 is connected to the genuine product certification processing server 300. A genuine product certification process is monitored on a screen of the server monitoring terminal 320 beginning with a process in which the wired or wireless terminal 200 including an RFID writer and reader recognizes the RFID tag 100 attached to the product or document at the recognition distance. When the RFID tag 100 is recognized and the product or document is not certified as genuine, the server monitoring terminal 320 generates an alarm, checks the GPS location of the wired or wireless terminal, and monitors the RFID tag 100 attached to the product or document.

As such, it is possible to prevent imitations (fakes) of medicine, food and beverages, luxury goods, alcohol, products, etc. to which RFID tags are attached and forgery of important documents, such as an ID card, a contract, and a notarized document to which RFID tags are attached. The genuine product certification processing server 300 can prevent forgery of RFID tags attached to products and documents by updating the RFID tags with new genuine product certification codes through the wired or wireless terminal 200 including an RFID writer and reader, storing the new genuine product certification codes in the genuine product certification processing server 300 and the wired or wireless terminal 200, and also storing the update times and log records at regular intervals or every time genuine product certification is attempted.

As described above, the method of the inventive concept can be implemented as a program and stored in a recording medium (a compact disc read-only memory (CD-ROM), a random access memory (RAM), a ROM, a memory card, a hard disk drive, a magneto-optical disk, a storage device, etc.) in a form that can be read using computer software.

DESCRIPTION FOR REFERENCE SIGNS

100: RFID tag
200: wired or wireless terminal including RFID writer and reader
300: genuine product certification processing server
310: genuine product certification information storage device
320: server monitoring terminal on which genuine product certification app is installed

INDUSTRIAL APPLICATIONS

In a radio frequency identification (RFID)-based genuine product certification service system and method employing a code update algorithm for forgery prevention according to the inventive concept, a genuine product certification processing server stores an RFID tag access code and a variable genuine product certification code in an RFID tag through a wired or wireless terminal including an RFID writer and reader and a database thereof for genuine product certification to determine whether a product or document is genuine using the tag information stored in the RFID tag and the genuine product certification code when RFID tags are used to prevent imitations (fakes) of medicine, food and beverages, luxury goods, alcohol, products, etc. and forgery of important documents, such as an ID card, a contract, and a notarized document, and changes the genuine product certification code in the RFID tag through the wired or wireless terminal including an RFID writer and reader at a genuine product certification attempt or at regular intervals. Accordingly, it is possible to prevent a genuine product certification attempt with a duplicate using the periodically updated variable genuine product certification code even when a person copies the RFID tag for the purpose of forgery.

As such, it is possible to prevent imitations (fakes) of medicine, food and beverages, luxury goods, alcohol, products, etc. to which RFID tags are attached and forgery of important documents, such as an ID card, a contract, and a notarized document to which RFID tags are attached. The genuine product certification processing server can prevent forgery of RFID tags attached to products and documents by updating the RFID tags with new genuine product certification codes through the wired or wireless terminal including an RFID writer and reader at regular intervals or every time genuine product certification is attempted.

What is claimed is:

1. A radio frequency identification (RFID)-based genuine product certification service system employing a code update algorithm for forgery prevention, the system comprising:
an RFID tag configured to be attached to a product or document;
a wired or wireless terminal including an RFID writer and reader configured to receive a new genuine product certification code updated at regular intervals or every time genuine product certification is attempted from a genuine product certification processing server, write the received new genuine product certification code in the RFID tag, and read and decode an RFID tag ID number, an RFID tag access code, and a genuine product certification code from the RFID tag at a recognition distance;
a genuine product certification processing server configured to receive, based on the RFID tag receiving an RFID tag access code from the wired or wireless terminal and confirming an access right, an RFID tag ID number and a genuine product certification code through the wired or wireless terminal including an RFID writer and reader, compare the received genuine product certification code with a genuine product certification code previously stored in a storage device, provide a genuine product certificate and detailed product information to the wired or wireless terminal, and store a receiving time and log information; and
a genuine product certification information storage device configured to be connected to the genuine product certification processing server and store an RFID tag ID number, an RFID tag access code, a genuine product certification code, and detailed product information of each RFID tag.

2. The RFID-based genuine product certification service system of claim 1, wherein the RFID tag attached to the product or document includes an antenna, a tag chip, and a memory,
the unique RFID tag ID number, the RFID tag access code, and the genuine product certification code are stored in the RFID tag, and
the new genuine product certification code, which is variably updated to prevent forgery at regular intervals or every time genuine product certification is attempted, is stored in the RFID tag.

3. The RFID-based genuine product certification service system of claim 1, wherein the wired or wireless terminal including an RFID writer and reader is a smart phone or a tablet personal computer (PC) which includes a wireless fidelity (Wi-Fi) communication unit, a Bluetooth communication unit, or a mobile communication unit supporting a code division multiple access (CDMA) or long term evolution (LTE) protocol so as to be connected to the genuine product certification processing server, to which the RFID writer and reader are connected, and on which a genuine product certification application (app) is installed.

4. The RFID-based genuine product certification service system of claim 1, wherein the wired or wireless terminal including an RFID writer and reader is a narrowband Internet of things (NB-IoT) terminal which includes a key input unit, a main control unit (MCU), a storage unit, a display unit, an NB-IoT module, and a global positioning system (GPS) receiver and on which the RFID writer and reader are mounted and a genuine product certification application (app) is installed, or is an IoT device which includes a key input unit, an MCU, a storage unit, a display unit, a Wi-Fi communication unit, a Bluetooth communication unit, and a GPS receiver and on which the RFID writer and reader are mounted and a genuine product certification app is installed, and
the wired or wireless terminal further includes a GPS receiver and transmits information of the RFID tag attached to the product or document and GPS location information to the genuine product certification processing server at a corresponding location every time the wired or wireless terminal recognizes the RFID tag attached to the product or document.

5. The RFID-based genuine product certification service system of claim 1, further comprising a server monitoring terminal on which a genuine product certification application (app) is installed and which monitors states of the wired or wireless terminal including an RFID writer and reader and the genuine product certification app installed thereon, the genuine product certification processing server, and the genuine product certification information storage device, wherein the server monitoring terminal is connected to the genuine product certification processing server, a genuine product certification process is monitored on a screen of the server monitoring terminal, including a process in which the wired or wireless terminal including an RFID writer and reader recognizes the RFID tag attached to the product or document at the recognition distance, and based on the RFID tag being read and the product or document not being certified as genuine, the server monitoring terminal generates an alarm, checks a global positioning system (GPS) location of the wired or wireless terminal, and monitors the RFID tag attached to the product or document.

6. The RFID-based genuine product certification service system of claim 1, wherein the genuine product certification processing server stores a new genuine product certification code for preventing forgery of the product or document in a genuine product certification information storage device thereof at regular intervals or every time genuine product certification is attempted and simultaneously stores the new genuine product certification code in the RFID tag attached to the product or document through the wired or wireless terminal including an RFID writer and reader.

7. A radio frequency identification (RFID)-based genuine product certification service method employing a code update algorithm for forgery prevention, the method comprising:

an (a) step in which an RFID tag ID number, an RFID tag access code, and a genuine product certification code are stored in an RFID tag, and a wired or wireless terminal including an RFID writer and reader recognizes an RFID tag attached to a product or document at a recognition distance;

a (b) step in which the wired or wireless terminal requests the recognized RFID tag and the RFID tag access code from a genuine product certification processing server, and the genuine product certification processing server checks an access right to the RFID tag by inquiring of a genuine product certification information storage device and transmits an RFID tag access code for the RFID tag to the wired or wireless terminal;

a (c) step in which the wired or wireless terminal transmits the RFID tag access code to the RFID tag, the RFID tag compares the received RFID tag access code with the RFID tag access code stored in a memory thereof, and based on the RFID tag access codes coinciding with each other, the wired or wireless terminal recognizes the RFID tag ID number and the genuine product certification code of the RFID taq and requests genuine product certification by transmitting the RFID tag ID number and the genuine product certification code to the genuine product certification processing server;

a (d) step in which the genuine product certification processing server retrieves detailed product information of the RFID tag, with which genuine product certification has been requested, stored in the genuine product certification information storage device, transmits a genuine product certification success response, the detailed product information, and a new genuine product certification code to the wired or wireless terminal based on the genuine product certification code coinciding with the genuine product certification code stored in the genuine product certification information storage device, and stores the new genuine product certification code in the genuine product certification information storage device; and an (e) step in which the wired or wireless terminal outputs a success of genuine product certification and the detailed product information on a display window thereof and transmits the new genuine product certification code to the RFID tag, and the RFID tag stores the new genuine product certification code.

8. The RFID-based genuine product certification service method of claim 7, wherein the wired or wireless terminal including an RFID writer and reader is a smart phone or a tablet personal computer (PC) which includes a wireless fidelity (Wi-Fi) communication unit, a Bluetooth communication unit, or a mobile communication unit supporting a code division multiple access (CDMA) or long term evolution (LTE) protocol and a global positioning system (GPS) receiver so as to be connected to the genuine product certification processing server, to which the RFID writer and reader are connected, and on which a genuine product certification application (app) is installed.

9. The RFID-based genuine product certification service method of claim 7, wherein the wired or wireless terminal including an RFID writer and reader is a narrowband Internet of things (NB-IoT) terminal which includes a key input unit, a main control unit (MCU), a storage unit, a display unit, an NB-IoT module, and a global positioning system (GPS) receiver and on which the RFID writer and reader are mounted, or is an IoT device which includes a key input unit, an MCU, a storage unit, a display unit, a wireless fidelity (Wi-Fi) communication unit, a Bluetooth communication unit, and a GPS receiver and on which the RFID writer and reader are mounted and a genuine product certification application (app) is installed, and the wired or wireless terminal further includes a GPS receiver and transmits information of the RFID tag attached to the product or document and GPS location information to the genuine product certification processing server at a corresponding location every time the wired or wireless terminal recognizes the RFID tag attached to the product or document.

10. The RFID-based genuine product certification service method of claim 7, further comprising an (f) step in which a server monitoring terminal having a genuine product certification application (app) installed thereon monitors states of the wired or wireless terminal including an RFID writer and reader and the genuine product certification app installed thereon, the genuine product certification processing server, and the genuine product certification information storage device in an RFID-based genuine product certification service system employing a code update algorithm for forgery prevention, wherein the server monitoring terminal is connected to the genuine product certification processing server, a genuine product certification process is monitored on a screen of the server monitoring terminal including a process in which the wired or wireless terminal including an RFID writer and reader recognizes the RFID tag attached to the product or document at the recognition distance, and based on the RFID tag being read and the product or document not being certified as genuine, the server monitoring terminal generates an alarm, checks a global positioning system (GPS) location of the wired or wireless terminal, and monitors the RFID tag attached to the product or document.

11. The RFID-based genuine product certification service method of claim 7, wherein the RFID tag attached to the product or document includes an antenna, a tag chip, and a memory, and the unique RFID tag ID number, the RFID tag access code, and the genuine product certification code are stored in the RFID tag, further comprising storing the new genuine product certification code, which is variably updated to prevent forgery at regular intervals or every time genuine product certification is attempted, in the genuine product certification information storage device of the genuine product certification processing server, recording a corresponding time and log information, and simultaneously writing and storing the new genuine product certification code in the RFID tag attached to the product or document through the wired or wireless terminal including an RFID writer and reader.

12. The RFID-based genuine product certification service of claim 7, wherein in the (d) and (e) steps, the genuine product certification processing server provides a genuine product certificate and detailed product information to the wired or wireless terminal according to the RFID tag ID number and the genuine product certification code at regular intervals or every time genuine product certification is attempted.

\* \* \* \* \*